United States Patent
Graham et al.

(10) Patent No.: US 6,647,360 B2
(45) Date of Patent: Nov. 11, 2003

(54) SCROLLING OF DATABASE INFORMATION

(75) Inventors: Stephen Thomas Graham, Auckland (NZ); James Leonard Dunwoody, Wellington (NZ); John Stanley Spence, Lower Hutt (NZ); Nigel James Ramsay, Lower Hutt (NZ)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 09/745,127

(22) Filed: Dec. 21, 2000

(65) Prior Publication Data

US 2001/0005850 A1 Jun. 28, 2001

(30) Foreign Application Priority Data

Dec. 21, 1999 (JP) .............................. 11-362195

(51) Int. Cl.[7] .............................................. G06F 17/30
(52) U.S. Cl. ....................................... 703/3; 703/104.1
(58) Field of Search ............................. 707/1, 2, 3, 4, 707/10, 101, 102; 717/114

(56) References Cited

U.S. PATENT DOCUMENTS 5,826,253 A * 10/1998 Bredenberg .................... 707/1
5,835,904 A * 11/1998 Vicik et al. ..................... 707/1
6,044,216 A *  3/2000 Bhargava et al. ............ 717/114
6,339,772 B1 *  1/2002 Klein et al. ..................... 707/3

* cited by examiner

Primary Examiner—Diane D. Mizrahi
Assistant Examiner—Yicun Wu
(74) Attorney, Agent, or Firm—Ronald L. Drumheller

(57) ABSTRACT

Methods and apparatus for scrolling database records, particularly in a client-server computing system, are disclosed. A database holds records, accessible by a server, that each include a unique identifier. A client requests the server to retrieve a set of database records. Records are retrieved from the database and stored on the server. The server determines an upper context token and a lower context token corresponding to the end records for a subset of those records. The upper and lower context tokens include a reference to the respective unique identifier. The first subset records is passed to the client for display. The client then makes a scrolling request by a previous or next subset of data, and passes the relevant upper or lower context token to the server. The server utilizes a context token to locate the adjacent subset of retrieved records, determines new and upper and lower context tokens for that adjacent subset of records, then returns the subset to the client together with the new context tokens.

6 Claims, 3 Drawing Sheets

SCROLLING OF DATABASE INFORMATION

FIELD OF THE INVENTION

This invention relates to computing that utilise databases. It relates particularly to the scrolling of result sets of database information.

BACKGROUND OF THE INVENTION

In modern large computing systems a common topology has three tiers: (i) a presentation tier characterised by multiple workstations focusing on user interactions, (ii) a business tier characterised by multiple servers executing application/business logic, and (iii) a data tier characterised by multiple databases working on data storage and organization. A Local or Wide Area Network (LAN/WAN) interconnects the three tier elements.

Such computing systems find application in many and varied fields, ranging from university research and teaching facilities to business applications. In fact, almost every business will utilise such a system to transact its functions and serve its clients. For example, a system may be used to control inventory, for word processing and accounts purposes, and for servicing client's enquiries. Many businesses have very large client bases and may provide an extensive inventory of goods and services. One illustrative example is a telecommunications service provider (Telco) that serves a countrywide client base. The Telco's subscribers thus can number in the millions, and each customer will expect an immediate response from a Customer Service Representative (CSR) to any inquiry, which can range from billing information, a request for a new service, or the placing of orders for a product.

Similar examples are seen in Utilities, insurance companies, banks, hospitals, law firms, accountancy firms, stock exchanges, universities and Government agencies, to name but a few.

The CSR workstations may be external users who have network connections to the database servers. For example, a customer may be using a web browser connected to a vendor's web server via the Internet to access information stored in the vendor's database.

In almost all computer applications there are many situations where a user is viewing a subset of a large list of data, for example a Telco CSR viewing the billing information for a client. In these cases some form of scrolling will need to be implemented. In computer terms, scrolling is the ability to move (text) from right to left or up and down on a screen in order to view text that cannot be contained within a single display image.

When one considers a user viewing a subset of a large list in a graphical user interface (GUI) window with a scroll bar, the host application must respond to the following requests: First, Last, Next, Previous, and Search. 'First' positions the GUI window over the first subset of the list. 'Last' displays the final subset of the list. Given that the GUI window is displaying a subset of the list, 'Next' displays the next subset, and 'Previous' displays the previous subset. The 'Search' request gives the user the ability to find specific data within the list.

In client-server systems there are many problems associated with storing the potentially huge list of data on the server machine while the user (client) is scrolling over it. For example:

1. The server machine may run out of resources because it is holding result sets for many clients.

2. The server machine has to know when the client has finished.

3. If the client machine has crashed, and some form of 'pinging' is attempted to solve this, does the server have access to the client (e.g. if the client machine is behind a "firewall")? If time-outs are used, what should the time-out be set to? Can the server be brought down by simply initiating many queries resulting in large scrolling lists during the time-out period? (Note also, that it is usually not acceptable to solve this by maintaining a (socket) connection between a client and server over a WAN due to a lack of network reliability.)

4. In many larger systems, and in Internet web server-based applications particularly, the server side of the application is implemented in such a way that client information cannot be held between transactions to allow greater throughput and prohibit resource over-use. In these systems, the data cannot be held between the scrolling requests.

There are also problems associated with transmitting the list to the client and storing it there. For example:

1. The list may be huge, and transmitting it would be unacceptably slow or impossible. In Internet-based applications, often the client is using a modem. Typical modem speeds are in the order of a few kilobytes of data per second. The list may easily be in the order of megabytes, or tens of megabytes, resulting in uselessly slow transfer. Some clients may have reliable and fast connections to the servers, while others have unreliable or slow connections.

2. The user must wait for transmission of the entire list before any of it can be displayed. If the application matches the user requirements well, typically the first window of data will be the most important and although access to the rest of the list may be required, it is often accessed much less frequently than the first window.

3. Storage must be reserved on the client machine for the list.

A specific known scolling arrangement is disclosed in published Japanese Patent Application No. 06-314306 (Hitachi Ltd, Takashi and Michiko), entitled: Data Base Display Method. This reference describes the workstation receiving a retrieved result set and storing it in a local file, then performing an extraction of the local file to display a portion of the data. This method suffers all the problems associated with transmitting the list to the client described above.

It is an object of the present invention to enable scrolling of data base result sets without incurring the problems associated with the prior art.

SUMMARY OF THE INVENTION

The invention provides a method for scrolling database records, comprising the steps of (a) allocating a unique identifier to each database record;

(b) determining an upper context token and a lower context token corresponding to the end records for a subset of said records, the upper and lower context tokens including at least said identifier for the respective record; and (c) for a scrolling request, utilizing the relevant upper or lower context token to locate an adjacent subset of said records The invention further provides a method for scrolling database records on a client-server system where a database holds records, accessible by said server, that each includes a unique identifier, the method comprising the steps of:

(a) retrieving a set of said database records;

(b) the server determining an upper context token and a lower context token corresponding to the end records for a subset of said records, the upper and lower context tokens including at least said identifier for the respective record; and (c) on a scrolling request by said client, the server utilizing the relevant upper or lower context token to locate an adjacent subset of said retrieved records;

(d) determining new upper and lower context tokens for said adjacent subset of records; and (e) returning said subset to said client, together with said new context tokens.

Scrolling requests can include a next subset commencing from a lower context token, or a previous subset commencing from an upper context token. The scrolling requests further can include an additional statement in the search string that has predicates that include a reference to the unique identifiers. A search order statement can further be included in the scrolling request search string, the statement constituting the upper and lower context tokens, and including the references.

The invention yet further provides a client-server computing system providing scrolling of database records, comprising:

(a) one or more client computers running an application program that permits scrolling requests of data;

(b) a server computer, also running said client application program, and in communication with said clients by a communications link; and (c) a database holding a store of records, accessible by said server, each said record having a unique identifier; and wherein said clients are operable to request a set of records from said server, to be returned by said server after retrieval from said database together with upper and lower context tokens, and said server is operable to determine said upper and lower context tokens that define end records of a subset of said retrieved records, the upper and lower context tokens including at least said identifier for the respective record, said context tokens locating an adjacent subset of said records.

The server includes a memory to store said set of database records, and a scrolling request from said client will include either an upper or lower context token that is utilized to retrieve the respective next subset of records from said stored set.

BRIEF DESCRIPTION OF THE DRAWINGS

Non-limiting embodiments of the invention will now be described with reference to the accompanying drawings, in which.

DETAILED DESCRIPTION OF EMBODIMENTS AND BEST MODE

Representative Client-Server Platform

Figure 1:
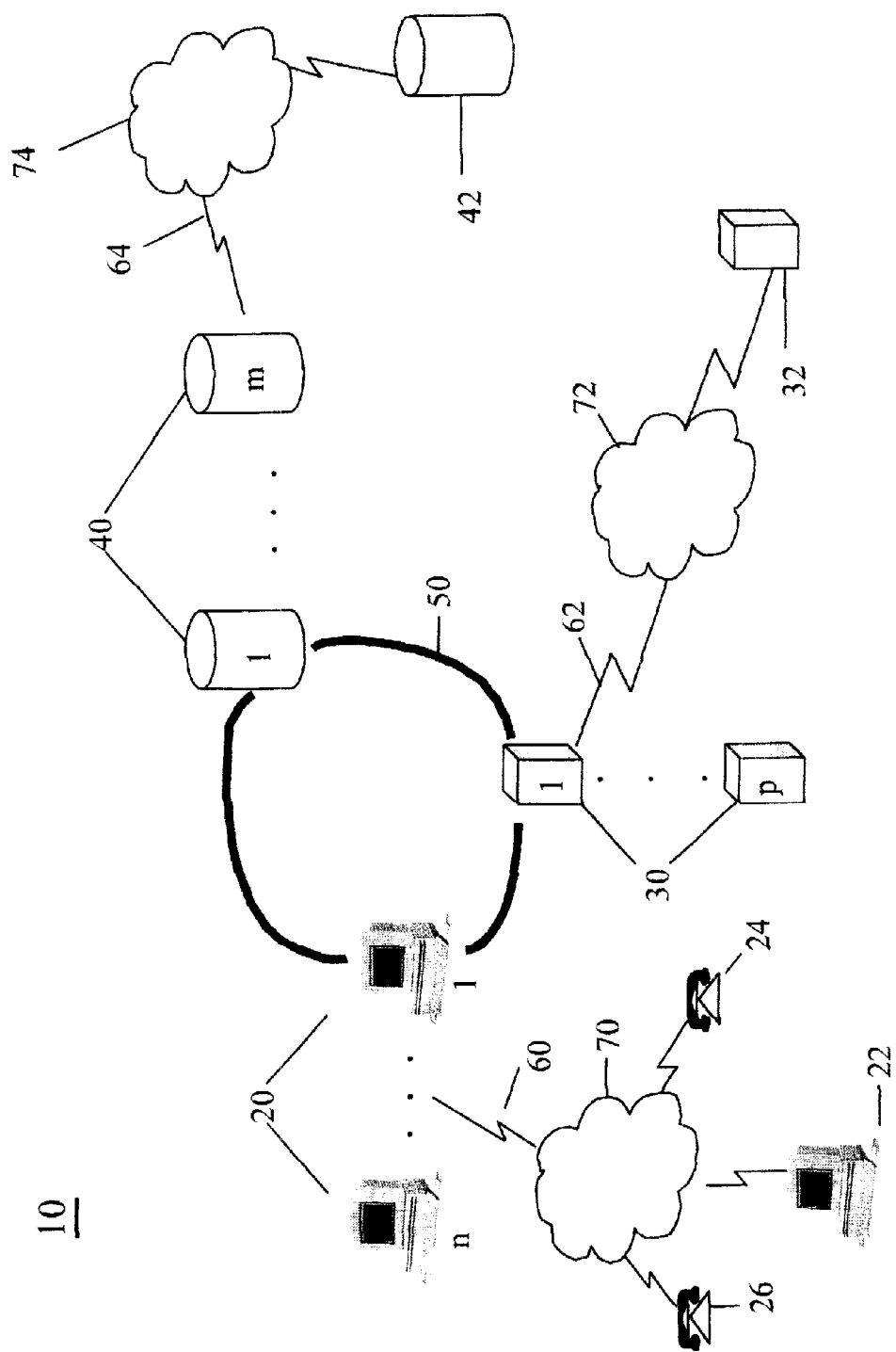
FIG. 1 is a representative topology of a three tier computing system embodying the invention.

FIG. 1 is a representative topology of a three tier computing system 10 embodying the invention. The presentation (or client/user) tier is represented by a number (1 ... n) of client workstations 20, that can be appropriate computing terminals, for example personal computers. The business tier is represented by a number (1 ... p) of servers 30, that can be dedicated mini or mainframe computers. The data tier is represented by a number (1 ... m) of databases 40, which can include dynamically managed magnetic or optical storage media.

The computing system 10 is of an 'open' design, providing communication links 60,62,64, via external networks 70,72,74 to like-devices 22,32,42 and remote telephone terminals 24, 26.

The workstations 20, servers 30, and databases 40 are interconnected by a Local or Wide Area Network (LAN or WAN) 50. The LAN/WAN 50 carries information passing between each of the three basic elements described. It will be appreciated that the topology shown in FIG. 1 is representative only, and that any other convenient form of network could be implemented such that the objective of information passing between the workstations 20, servers 30 and databases 40 is achieved.

Embodiments of the invention find industrial application in the fields noted in the foregoing Background section. For the purposes of a non-limiting illustration, consider the example of a Telco operating across many States of the United States. Such a Telco will typically support local, regional interstate and international voice and data calls, as well as cellular mobile voice and data traffic. Customers of the Telco can choose from a wide range of goods and services including, for example, the installation of second phone/fax/Internet lines, call forwarding, and messaging. They also will expect to be able to make enquiries of CSRs stationed at the workstations 20 concerning billing and service faults. It is not unreasonable to expect a modern-day Telco to have at least 1 million customers, typically requiring at least 500 CSRs. A Telco system infrastructure of this size can expect to handle about 15,000 business transactions per hour. For each business transaction there may be 6 CSR machine transactions required, and each individual machine transaction can involve up to 20 database transactions (i.e. I/Os).

To give a better example of the size of computing hardware required to achieve such performance, it is considered that the CSR workstations 20 should be Pentium™ personal computers running the Windows NT™ operating system, the servers 30 can be one or more IBM UNIX™-based 12-way RS6000™ S-70 machines, and the databases would require a capacity of about 40 Gbytes, managed by an Oracle™ or IBM DB-2™ system. There would, of course, be other operational LAN/WAN servers required to handle data communications, as would be readily understood by a person skilled in the art.

Scrolling in a Generalized Client-Server Architecture

Figure 2:
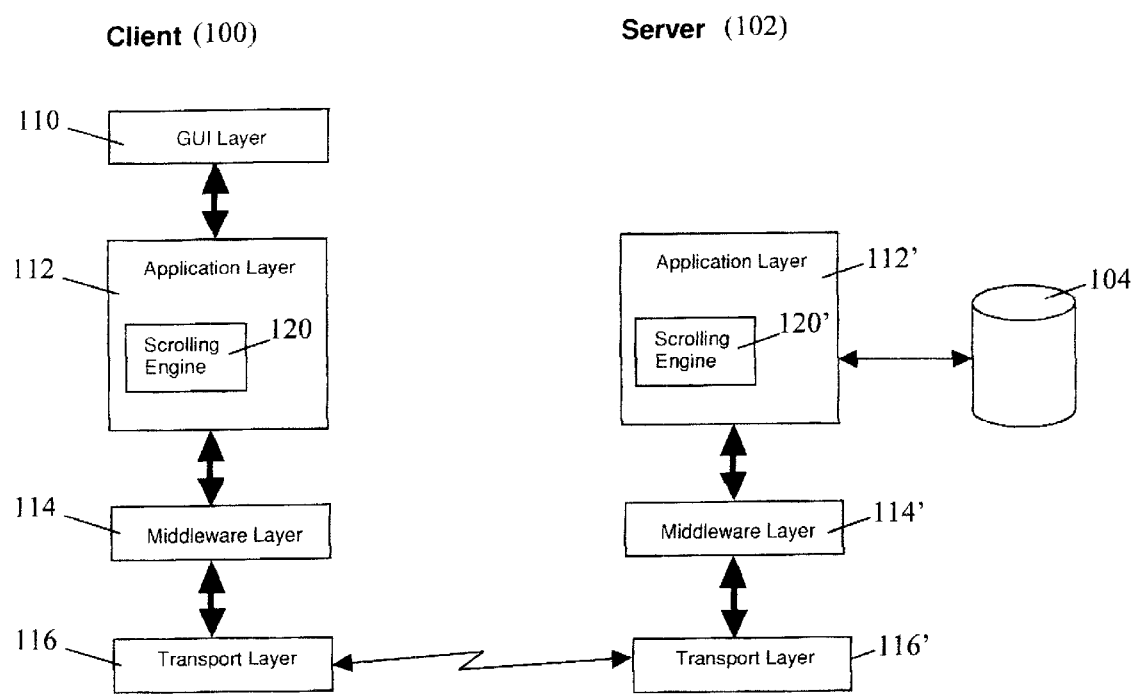
FIG. 2 shows a simplified client-server architecture.

FIG. 2 shows a generalized computing architecture for a client-server system. The client process 100 can be a workstation 20 as shown in FIG. 1, with the server process 102 being any one of the server machines 30, also shown in FIG. 1. In a similar way, the database 104 can represent one of the datastores 40 shown in FIG. 1. Equally, however, the client process 100 and server process 102 could reside on a single machine (for example, a single server machine 30).

On the client machine 102, a Graphical User Interface (GUI) layer 110 provides the human-machine interface for a user. The GUI layer interfaces with an application layer 112, where the specific computing operation or purpose performed by the client-server system resides. The application layer interfaces with a middleware layer 114 that handles aspects such as system resource usage, operating system locks, shared memory access, container services, queuing services, transaction services, logical unit of work coordination, inter-process communications, user access control services, and configuration retrieval services. The middleware layer 114 represents the operating system and communications services. In an Object Oriented environment, objects are instantiated by the middleware in response to service requests. The transport layer 116 of the client machine 100 is in network communication with the server 102, usually transmitting a binary string representation of an object. The server process 102 replicates the transport layer 116', the middleware layer 114', and the application layer 112' functions.

The middleware layer 114, 114' can be, for example, any one of the CICS™, ENCINA™ or CBConnector™ products of International Business Machines Corporation.

The respective application layers 112, 112', can be implemented by the UNIX™ operating system. For the server application layer 112, 112', there is the additional database process, which can be any convenient relational database, such as the DB2™ product of International Business Machines Corporation. The database 104 is accessed The respective application layers 112, 112', contain a co-operating scrolling engine 120, 120'. The scrolling engines would be written in a high-level programming language, as would be apparent to one skilled in the art following the teaching herewithin.

Scrolling Operation

In a typical database enquiry, a CSR enquiry may result in the database returning a result set of some hundreds or thousands of lines to the server where only, say, twenty to fifty lines will be displayed by the GUI 110 at any one time. The full result set resides on the server 102, and only the requested portions are passed to the client 100 in accordance with a scrolling request.

The client issues a query to the server to retrieve the initial subset of the (potentially very large) data list of interest. The server queries the database and returns to the client the subset of data requested along with an upper "context token" and a lower "context token". A "context token" is a piece of data that contains sufficient information to reposition the server database in such a way that it will return the next (or previous) subset of the data if the client subsequently issues a "Next" (or "Previous") scrolling request.

When the user scrolls down beyond the subset of data being viewed, the Next request is sent from the client to the server along with the lower context token. On the server, the context token alters the original database query in such a way that the database returns the next subset of data rather than the original subset. The server transmits the subset to the client along with newly determined upper and lower context tokens. Similarly, if the user scrolls above the top of the data subset they are viewing, a Previous returns the next subset of data rather than the original subset. The server transmits the subset to the client along with newly determined upper and lower context tokens.

Importantly, the entire list of data is not transmitted to the client and no information relating to the client is needed to be maintained on the server between requests.

By determining and storing the context on the client, the server is not required to maintain any separate processes or context resources associated with each client that is scrolling. In this way, client sessions can halt in the process of scrolling and not leave the server waiting indefinitely.

In the case of a relational database, the context becomes part of the query terms for an SQL query that generates the result set. The general query in the prior art would be:

SELECT A, B, C
FROM <your-table>
WHERE <your-predicates>
ORDER BY B,C

For the present invention, this statement is modified as follows:

SELECT A, B, C, D, OID
FROM <your-table>
WHERE <your-predicates>
   AND B>:b OR (B=:b AND (C>:c OR (C=:c AND
     OID>:oid)))
ORDER BY B, C, OID The database is arranged to have a unique value for each row (or entry) so that duplicate data values can be differentiated. The differentiator in this case is the "OID" (object id). In this example, the client user required this query to be sorted by columns B and C. The fields in the ORDER BY clause are the context token The OID must always be the last field in the ORDER BY to ensure that each row returned is unique. If there is no ORDER BY required by the application, then ORDER BY OID is added to the query in default.

For a first database request, for rows 1 . . . x (where x is the number to fetch), suitable values for :b, :c, and :oid are provided to allow the first rows to be returned. The context token would then be the values of B, C and OID for row x. (Incidentally, NULLs will usually be appropriate for context token values for the First, Last, Search and Reverse Search queries, as an SQL database ascending searching places NULL before other values). A subsequent request for the Next set of data would pass the context token with values :b, :c, and :oid from the last line of the immediately preceding request. This enables the cursor to be reopened at the required position—in this case row x+1.

All of the ORDER BY columns (i.e. the context token) must always appear in predicates in the AND clauses of the query, as in the example above. Note, however, that the columns in the AND clause predicates do not necessarily form part of the 'ORDER BY'. Also note that the 'ORDER BY' columns must be returned to the client for each row, and hence must be in the SELECT clause. It is rare to sort on non-displayed data, so usually the only extra data returned will be the OID.

The context token needs to be modified to form different scrolling queries (i.e. by the addition of the ORDER BY and context token WHERE predicates, and SELECTing the context token). For example, there is a different form of query for 'Next' as opposed to 'Previous', because 'Next' needs greater than signs (i.e. >) and ascending sorting, whereas 'Previous' needs less than signs (i.e. <) and sorting must be done in a descending manner.

The 'Search' query is equivalent to the 'First' query with additional WHERE search criteria. Both need to have the context token included in the SELECT statement, and both require the ORDER BY field. A 'Next' query is equivalent with these two as well, with the addition of the context token WHERE criteria. Similarly, the 'Last' query is equivalent to original query modified to have the ORDER BY with DESCending on each field, and the context token SELECTed. The 'Previous' query is the same as the Last' query, with the additional context token WHERE criteria, and using less than signs instead of greater than signs. Further, a reverse search could be implemented by adding the search criteria to the 'Last' query.

In systems that may not be relational databases, scrolling is still possible in the manner described provided that the context is a primary key in the result set. In fact, this is the usual manner in which databases operate.

Specific Example

Figure 3:
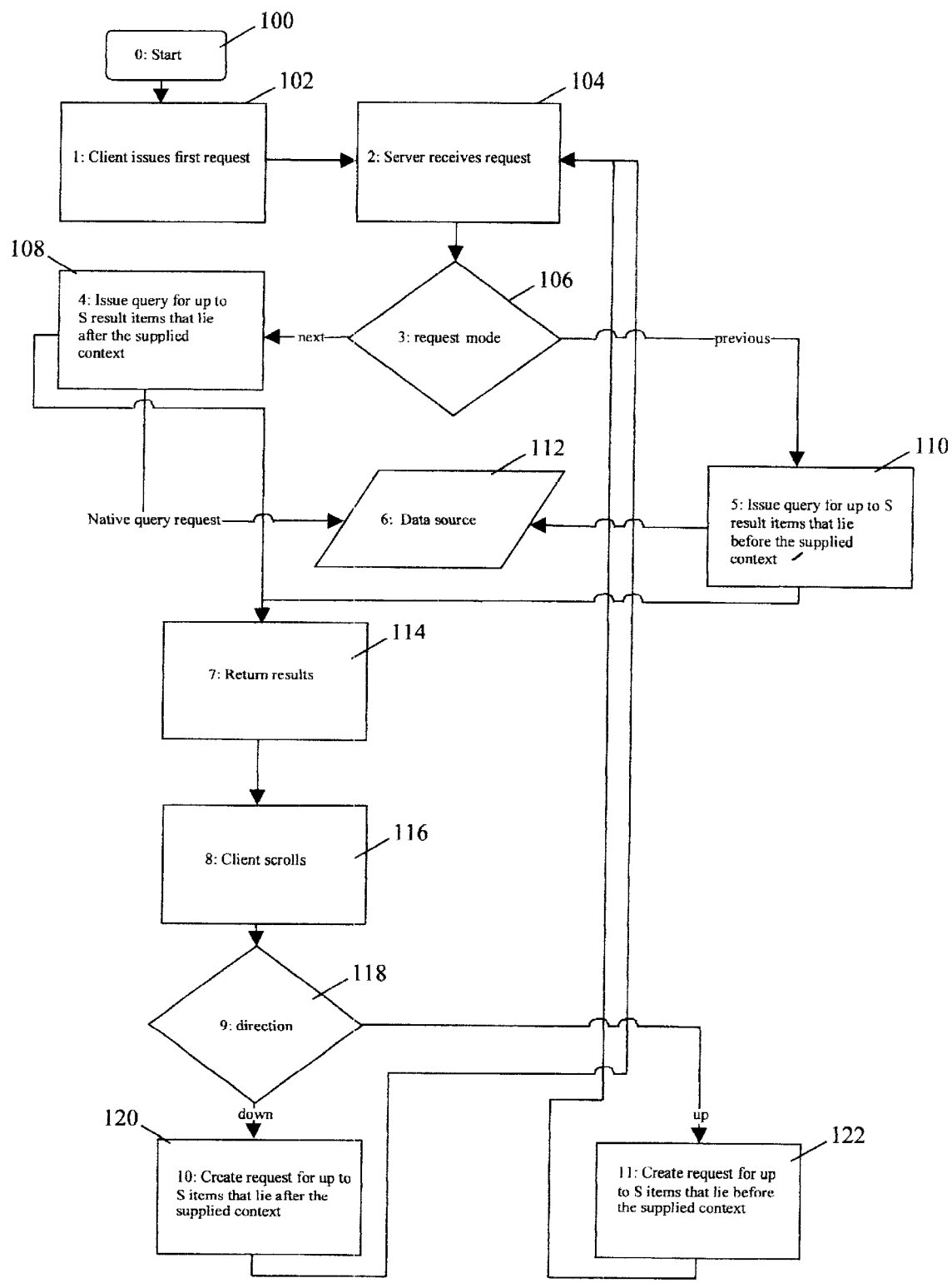
FIG. 3 is a flow chart embodying the invention.

Referring now to FIG. 3, which is a flow diagram in accordance with an embodiment of the invention, a specific example of scrolling will now be descibed.

Following the Start step 100, the client requests, in step 102, a first portion of a retrieved result set to be viewed. The first request can be in the following form:

| Constant query conditions | :name >= Smith, age >= 0 |
|---|---|
| Context | :name = Smith, age = 0, oid = 0 |
| Mode | :next |
| Size | :30 |

The constant 'query conditions' specifies the entire result set. The 'size' specifies the size of the result set returned for each transaction for the first request made of the server. The 'context' refers to an entry that lies above, or is the first entry. That is, the 'context' noted above would be correct if the result set were:

| Name | Age | Oid |
|---|---|---|
| Smith | 40 | 276 |
| Smith | 50 | 34 |
| Smith | 60 | 345 |
| Smith | 70 | 44 |
| Smith | 80 | 233 |
| Smyth | 100 | 800 |

In step 104, the server receives the request from the client. In step 106, the server ascertains the request 'mode', being either 'Next' or 'Previous'. In step 108, the server issues a query to the database for the 'Next' portion of data. In the case of an SQL structure, the request would be of the form:

SELECT Name, Age, Oid
FROM Table
WHERE name>=Smith
AND age>=0
AND name>Smyth OR (name=Smyth AND age>100 OR (age=100 AND Oid>800))
ORDER BY Name, Age, Oid In step 110, the server has issued a request for the 'Previous' portion of the result set. So for the same data as given above, the request would be:

SELECT Name, Age, Oid
FROM Table
WHERE name>=Smith
AND age>=0
AND name<Smith OR (name=Smith AND age<40) OR (age=40 AND Oid<276))
ORDER BY Name DESC, Age DESC, Oid DESC The result set is retrieved in a reverse sorted manner by the database. Thus, the result set begins above the upper context token and the proceeds backwards through the list.

Step 112 represents the database access. If the database can return a result set above or below the context available, it can be used for scrolling. As follows, it then does not necessarily have to be relational database. In step 114, the requested portion of the result set (whether for the 'Next' or 'Previous' query mode) is returned to the client. In step 116, the client now has the requested portion of data displayed. In step 118, the client can issue scrolling commands for new screens of data. The commands can be for movement up or down compared with the current context.

In step 120, the user has taken the object closest to the bottom of the screen and the client sends the lower context token with the Next query to the server. Consider the following screen display:

| Name | Age | Oid |
|---|---|---|
| Smyth | 17 | 247 |
| Smyth | 17 | 455 |
| Smyth | 18 | 23 |
| Smyth | 20 | 234 |
| Smyth | 30 | 400 |

Name=Smyth, Age=30, and Oid=400
Thus, the query to request the 'Next' page would be:
SELECT Name, Age, Oid
FROM Table
WHERE name>=Smith
AND age>=0
AND name>Smyth OR (name Smyth AND age>30 OR (age=30 AND Oid>400))
ORDER BY Name, Age, Oid As can be noted, the first two clauses remain the same, i.e.:
WHERE name>=Smith
AND age>=0
The third clause enforces the context.

In step 122, the user chooses the record closest to the top of the screen and the client application sends the upper context token and the 'Previous' query. For a screen display of the form:

| Name | Age | Oid |
|---|---|---|
| Smyth | 17 | 234 |
| Smyth | 17 | 455 |
| Smyth | 18 | 23 |
| Smyth | 20 | 234 |
| Smyth | 30 | 400 |

The context becomes:
Name=Smyth, Age=17 and Oid=234
In that case, the query to request the previous page would be:
SELECT Name, Age, Oid
FROM Table
WHERE name>=Smith
AND age>=0
AND name<Smyth OR (name=Smyth AND age<17 OR (age 17 AND Oid<234))
ORDER BY Name DESC, Age DESC, Oid DESC Again, it can be noted that the first two clauses remain the same, i.e.:
WHERE name>=Smith
AND age>0
The third clause enforces the context.

Further Example

A further example will now be given.

An original query which would return entire list of customers of a Telco living in New Zealand is of the form:
SELECT firstName, surname, age, country
FROM customers WHERE country='New Zealand'
ORDER BY surname, age 1. 'Next' Query A Next query is in the form of:

SELECT firstName, surname, age, country, oid
WHERE country='New Zealand'
AND surname>:surname OR (surname=:surname AND (age>:age OR (age=:age AND OID>:oid)))
ORDER BY surname, age, oid In this syntax, <surname, age, oid> is the context token—it is made up of the fields in the ORDER BY. The context token <:surname, :age, :oid> is part of the last retrieved line of data. The WHERE clause says that the 'Next' record after the given context token will be the one where the surname is greater than the one in the context token, OR if it is the same, it is necessary to look at the next field in the ORDER BY (i.e. age). So, the 'Next' record will be the one with the same surname and have an age greater than the one in the context token. However, if the age is the same also, then the 'Next' record will be the one where the surname is the same AND the age is the same AND the Oid is greater than the one in the context token. The Oid is unique, so it is always possible to obtain get the 'Next' record.

2. 'First' Query

The First query is of the form:

SELECT firstName, surname, age, country, oid
FROM Customers
WHERE country='New Zealand'
ORDER BY surname, age, oid Here, it is also possible to use the 'Next' query with the context token, <NULL, NULL, NULL>

3. Search Query

If the user wishes to search through the list of New Zealand customers to narrow it to those that haven't paid their account, then the search criteria is simply added to the First (or Next with <NULL, NULL, NULL>) data Notice too, that a Search Forward request (to search forward from the current position) is possible by adding the search SELECT firstName, surname, age, country, oid
FROM Customers
WHERE country='New Zealand'
AND surname>:surname OR (surname=surname AND (age>:age OR (age=:age AND oid>:oid)))
AND accountOverdrawn=true
ORDER BY surname, age, oid From this point (or until the search is cancelled) all Next and Previous queries have the additional search criteria "AND accountOverdrawn=true" added to their WHERE conditions.

4. 'Previous' Query

The Previous query is in the form:

SELECT firstName, surname, age, country, oid
FROM Customers
WHERE country='New Zealand' AND surname<:surname OR (surname=:surname AND (age<:age OR (age=age AND oid<:oid)))
ORDER BY surname DESC, age DESC, oid DESC
Note the 'DESC' on each field.

5. 'Last' Query

The Last query is of the form:

SELECT firstName, surname, age, country, oid
FROM Customers
WHERE country ='New Zealand'
ORDER BY surname DESC, age DESC, oid DESC Implementation In accordance with the invention, the context token technique requires modifications to the standard database query to produce scrolling queries.

The OID used in the examples is a unique identifier for each record in the data It is only necessary if the data in the ORDER BY is not already a primary key. If it is, or if a primary key can be created using some other field in the table(s), then the OID is not necessary. Note also, that many databases provide a unique identifier. For example, Oracle has a ROWID field that is equivalent to the OID in these examples.

Database indexes should be created covering (at least partially) the fields in the ORDER BY clauses. This is an efficient way to SELECT back data from large tables where the data is sorted.

It may be chosen to implement a cache on the client to hold a subset of the data larger than the user's window. This will allow 'tuning' of the scrolling according to network bandwidth, the application requirements, database efficiency, overall system performance, and client capacity. The cache could be implemented using a Least Recently Used algorithm As an example, a user may be connecting over a low bandwidth modem via the Internet to a Bank's web server. Such an Internet based application would not attempt to maintain any information on the server for the client application's current session. The user may wish to view a list of recent bank account details. They will have asked for the list sorted in reverse chronological order and it may be statistically known that such users tend to look back over the last few hundred details only. The list may be several thousand details long. Therefore, the application may dynamically decide to ask the server to retrieve 50 details at a time. This will allow a reasonably fast response over the slow network, and allow the user to see the first screen of, say, 25 details reasonably quickly. The actual cache on the client machine may be able to hold 100 details, limited by the available memory. When the user presses 'page down', the second screen of data is immediately available from the cache. A subsequent 'page down' would cause the client machine to request a further 50 details from the Bank's server. When returned, the user would see the third screen of 25 records. If the user pressed 'page up', the previous set would still be held in the cache, and would be immediately displayed.

It is be understood that the invention is not limited to the embodiments described, but that numerous alterations and modifications, as would be apparent to one skilled in the art, are included within its scope.

We claim:

1. A method for scrolling database records by a client on a client-server system where a database holds records, accessible by a server, that each includes a unique identifier, the method comprising the steps of:

(a) defining a set of the database records by the client with a query and retrieving a subset of said defined database records by the server for delivery to the client;

(b) determining an upper context token and a lower context token by the server corresponding to the end records for said subset of said defined records, the upper and lower context tokens including at least said identifier for the respective upper and lower records, the upper and lower context tokens being sent to and stored by the client; and (c) making a scrolling request by the client, said scrolling request including either the upper or lower context token, the server utilizing the included upper or lower context token to retrieve an adjacent subset of said defined records;

(d) the server determining new upper and lower context tokens for said adjacent subset of records; and (e) returning said adjacent subset to the client, together with the new context tokens.

2. The method of claim 1, whereby said scrolling request of step (c) requests either:

(i) a next subset commencing from the lower context token stored by the client; or (ii) a next previous subset commencing from the upper context token stored by the client.

3. The method of claim 2, whereby said step (c) includes the step, performed by the client, of:

(i) including an additional statement in a scrolling request search string that has predicates that include a reference to said unique identifiers.

4. The method of claim 3, including the further step of:

(ii) including a search order statement in said scrolling request search string, said statement constituting said upper and lower context tokens, and including said reference.

5. A client-server computing system providing scrolling of database records, comprising:

(a) one or more client computers running an application program that permits scrolling requests of data;

(b) a server computer, also running said client application program, and in communication with said client computers by a communications link; and (c) a database holding a store of records, accessible by said server computers, each said record having a unique identifier; and wherein each of said client computers is operable to define a set of records stored in said database and to request a subset of said set from one of said server computers, said one server computer retrieving said subset from said database and determining upper and lower context tokens that define end records of said subset, the upper and lower context tokens including at least said identifier for the respective end records, said context tokens being sent by said one server computer to said each client computer for locating an adjacent subset of said records.

6. The computing system of claim 5, wherein said one server computer includes a memory to store at least said subset of database records, and a scrolling request from said client computer will include either an upper or lower context token that is utilized by said one server computer to retrieve the respective next subset of records.

* * * * *